No. 617,237. Patented Jan. 3, 1899.
V. DREWSEN.
APPARATUS FOR MAKING BISULFITE OF LIME LIQUOR.
(Application filed Feb. 24, 1898.)
(No Model.)

WITNESSES:
INVENTOR
Viggo Drewsen
BY
ATTORNEYS.

UNITED STATES PATENT OFFICE.

VIGGO DREWSEN, OF NEW YORK, N. Y.

APPARATUS FOR MAKING BISULFITE-OF-LIME LIQUOR.

SPECIFICATION forming part of Letters Patent No. 617,237, dated January 3, 1899.

Application filed February 24, 1898. Serial No. 671,472. (No model.)

*To all whom it may concern:*

Be it known that I, VIGGO DREWSEN, a citizen of Norway, residing at Rosebank, in the borough of Richmond, New York, State of New York, have invented certain new and useful Improvements in Apparatus for Making Bisulfite-of-Lime Liquor, of which the following is a specification.

It is a well-known fact that in the preparation of bisulfite-of-lime or cooking liquor used in the manufacture of sulfite-pulp the caustic lime when brought in contact with sulfurous-acid gas generates a considerable amount of chemical heat. This chemical heat is especially objectionable in the summer-time, when the water employed is warm, as this raising of the temperature prevents the formation of bisulfite liquor of the required strength, for the reason that the heated liquor cannot absorb a sufficient quantity of sulfurous-acid gas. Experiments which have been made by me have shown that the development of this chemical heat takes place during the formation of the monosulfite of lime and magnesia when magnesia is contained in the caustic lime, while the transformation of the same into bisulfite-of-lime liquor takes place without the generation of chemical heat.

The object of this invention is to furnish an improved apparatus by which the generation of chemical heat in the manufacture of bisulfite-of-lime liquor is obviated; and for this purpose the invention consists of an apparatus for the manufacture of bisulfite-of-lime or cooking liquor comprising an absorbing-tank for the milk of lime, means for supplying sulfurous-acid gas to said tank, stirrer-arms in said tank for agitating said milk of lime during its transformation into monosulfite of lime, a cooling-coil connected with said tank, a circulating-pump for returning the cooled liquid from the coil to the absorbing-tank, a storage-tank connected with the absorbing-tank, and a tank or tanks connected with said storage-tank for changing the monosulfite into bisulfite of lime or cooking liquor.

Figure 1:
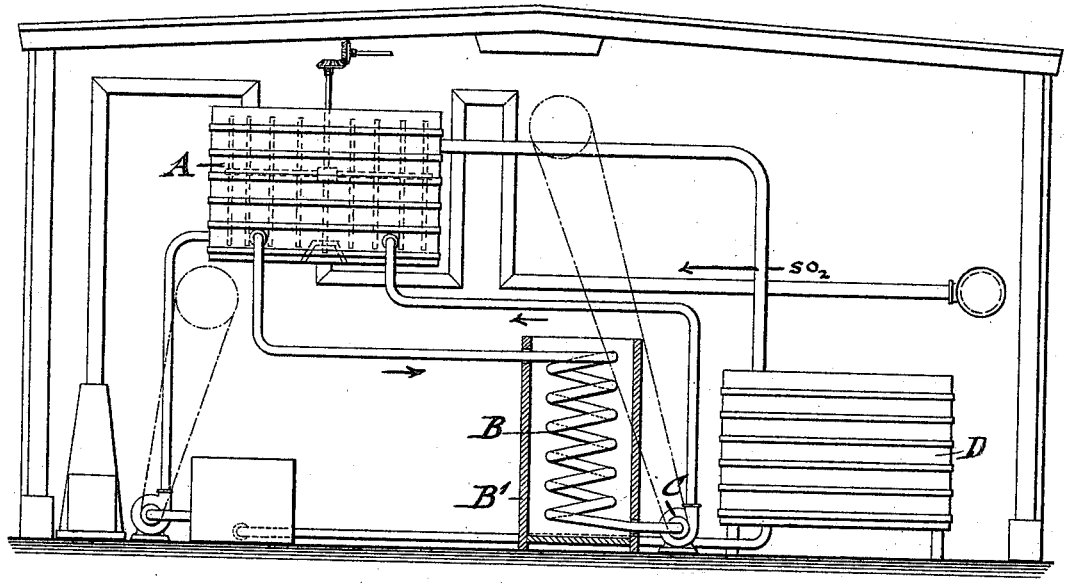
Figure 2:
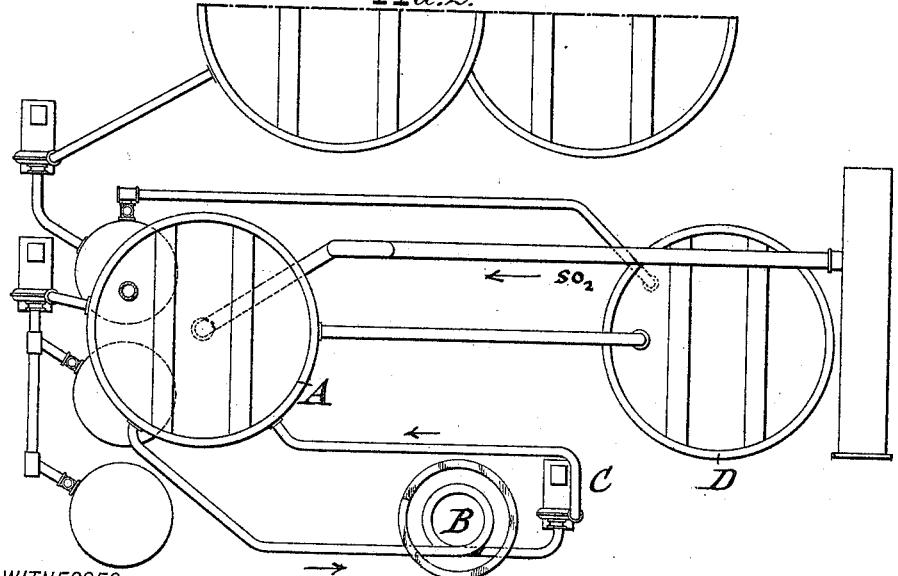

In the accompanying drawings, Figure 1 represents a side elevation, and Fig. 2 is a plan, of my improved apparatus.

Similar letters of reference indicate corresponding parts.

The drawings illustrate in addition to the particular apparatus necessary to carry out the formation of the monosulfite other apparatus common in systems of producing cooking liquor in pulp-mills, as at the left of Fig. 1, apparatus for preparing the mixture of caustic lime and water, and at the upper portion of Fig. 2 tanks for storage, dilution, and carrying on the change of monosulfite into bisulfite, which latter operation may be performed in the manner and with the apparatus now employed for producing bisulfite directly from the milk of lime. These parts of the apparatus may be in any of the common forms or arranged in any suitable manner and are not lettered in the drawings.

In carrying out my invention caustic lime is mixed with water, so that a concentrated milk of lime is obtained. This milk of lime is then conducted into an absorbing-tank A and subjected in the same to the action of sulfurous-acid gas, so that monosulfite of lime is formed. The gas is conducted to the absorbing-tank through the pipe (indicated by the arrow and the symbol $SO_2$) and enters the tank through the bottom of the same. The concentrated mixture of monosulfite of lime and water is then passed from the absorbing-tank A through a coil B, that is cooled by water in a tank B', as shown in Fig. 1, and pumped by a circulating-pump C back to the absorbing-tank, in which it is subjected to agitation by suitable stirrers, it being continuously passed through the cooling-coil and returned to the absorbing-tank, so that the chemical heat which is generated during the formation of the monosulfite of lime is removed and finally a cooled mixture of water and monosulfite of lime obtained. This mixture is then at about the same temperature as the river or other water usually employed in making the cooling liquor and therefore in a good condition for absorbing an additional quantity of free sulfurous acid, so as to form bisulfite of lime from the monosulfite. The cooled concentrated monosulfite of lime is conducted into a storage-tank D and pumped from the same into an additional tank, where it is diluted with water. This diluted mixture of monosulfite of lime is then subjected to the action of sulfurous-acid gas in the manner usually employed in sulfite-pulp mills for making the bisulfite-of-lime or cooking liquor.

Whenever the lime employed contains magnesia, then the formation of monosulfite of lime is accompanied by the formation of monosulfite of magnesium, which is deprived of its chemical heat by cooling in the same manner as the monosulfite of lime and finally changed into bisulfite of magnesium, when the monosulfite of lime is transformed into bisulfite of lime.

In the use of my improved apparatus the process of making the bisulfite of lime is separated into two steps, the first step being the formation of monosulfite of lime and the abstraction of the chemical heat generated in the formation of the same and the second step the additional treatment of the diluted mixture of monosulfite of lime with an additional quantity of sulfurous-acid gas. By the separation of the process into two distinct steps the monosulfite of lime is formed and the rise of temperature of the same neutralized, so that even during the summer months the production of bisulfite-of-lime or cooking liquor can be carried on without the least difficulty, for the simple reason that the chemical heat produced by the formation of the monosulfite of lime is abstracted by the action of the cooling-water. It is well known that the cooler the milk of lime the easier it will absorb the sulfurous-acid gas and the richer will be the cooking liquor in free sulfurous acid. The separation of the process into two steps can be readily carried out in any sulfite-mill, as one set of the tanks at present used in preparing the cooking liquor can be employed for the formation of the monosulfite of lime, while the remaining sets can be used in the ordinary manner for the preparation of the bisulfite or cooking liquor.

By the cooling of the liquid during the formation of the monosulfite cooking liquor of the required strength can be produced even in hot weather, as the cooling of the liquor in the monosulfite state permits the further saturation with sulfurous-acid gas and the consequent formation of bisulfite of lime. By reason of the division of the process into two steps or series of steps the advantage results that in practice the monosulfite may be diluted to a considerable extent before the final saturation and conversion into bisulfite.

Having thus described my invention, what I claim is—

An apparatus for the manufacture of bisulfite-of-lime or cooking liquor, consisting of an absorbing-tank for the milk of lime, means for supplying sulfurous-acid gas to said tank, stirrer-arms in said tank for agitating said milk of lime during its transformation into monosulfite of lime, a cooling-coil connected with said tank, a circulating-pump for returning the cooled liquid from the coil to the absorbing-tank, a storage-tank connected with the absorbing-tank, and a tank or tanks connected with said storage-tank for changing the monosulfite into bisulfite of lime or cooking liquor, substantially as set forth.

In testimony that I claim the foregoing as my invention I have signed my name in presence of two subscribing witnesses.

VIGGO DREWSEN.

Witnesses:
PAUL GOEPEL,
GEO. W. JAEKEL.